United States Patent [19]

Ferrar

[11] Patent Number: 5,090,809
[45] Date of Patent: Feb. 25, 1992

[54] MODULATION FREQUENCY CONTROL IN A FIBER OPTIC ROTATION SENSOR

[76] Inventor: Carl M. Ferrar, 114 Wildflower Rd., East Hartford, Conn. 06118

[21] Appl. No.: 533,196

[22] Filed: Jun. 4, 1990

[51] Int. Cl.$^5$ .............................. G01C 19/72
[52] U.S. Cl. .................................. 356/350
[58] Field of Search ............... 356/350, 345; 250/227.19, 227.27; 372/94

[56] References Cited

U.S. PATENT DOCUMENTS 4,883,358 11/1989 Orada .................................. 356/350

FOREIGN PATENT DOCUMENTS 2157425 10/1985 United Kingdom ................. 356/350

Primary Examiner—Samuel Turner
Attorney, Agent, or Firm—Richard H. Kosakowski

[57] ABSTRACT

In a fiber optic rotation sensor having a pair of light waves counter-propagating in an optical waveguide loop, a phase modulator is driven by a modulating signal at the loop eigenfrequency. Upon exiting the loop the waves are combined into a light intensity signal which is sensed, the sensed signal including a component in quadrature with a desired rotation rate component, the magnitude of the quadrature component being proportional to any deviations in the frequency of the modulating signal from the loop eigenfrequency. The phase modulator is servo-controlled so as to drive the quadrature component to zero, thereby compensating for any deviations in the modulator frequency from the loop eigenfrequency.

23 Claims, 4 Drawing Sheets

MODULATION FREQUENCY CONTROL IN A FIBER OPTIC ROTATION SENSOR

TECHNICAL FIELD

This invention relates to fiber optic rotation sensors, and more particularly to modulator frequency control in a fiber optic gyroscope.

BACKGROUND OF THE INVENTION

Interferometric signal analysis involves the determination of signal wavelength, wave velocities, distances and directions using interference phenomena between two signals Particular application may include optical signal analysis in a fiber optic gyroscope (FOG).

A FOG includes a light source, e.g., a laser diode, which provides coherent or semi-coherent light split into two substantially equal waves which counter-propagate in a coil of fiber optic waveguide. The waves are recombined interferometrically at the coil output such that the light intensity seen by a detector depends on the relative phases thereof.

When the coil rotates about a normal axis, the waves take different times to traverse the coil. This non-reciprocal phenomenon, known as the Sagnac effect, causes a change (shift) in the relative phase between the waves at a detector and, therefore, a change in the light intensity signal at the detector. Depending on the initial phase difference, which can be controlled by, e.g., application of suitable phase modulation at one end of the coil, the magnitude and direction, e.g., increase or decrease, of the change in the light intensity signal are dependent upon, respectively, the rate and sense of the rotation applied to the coil about the axis.

The detector signal intensity is a cosine function, and, thus, is relatively insensitive to small rotation rates. It is known to induce an optical phase modulation (phase dither) at a relatively high frequency, e.g., a sinusoid or square wave, on the counter-propagating waves to both increase FOG sensitivity and to determine the change in direction of FOG rotation. Additionally, control of the modulation frequency at the relatively high frequency (typically at the loop eigenfrequency) shifts the measurement bandwidth away from lower frequencies subject to excess noise. A phase modulator at one end of the coil is driven at a frequency corresponding to the coil eigenfrequency. The detector signal intensity is a function of both the modulation and rotation induced phase differences between the counter-propagating waves.

However, the eigenfrequency is dependent upon physical characteristics of the coil, including length and index of refraction of the coil optical waveguide. These characteristics may vary with changes in environment, e.g., temperature, thereby causing changes in the eigenfrequency. Variations in the modulation frequency from the coil eigenfrequency cause errors in the measured rotation rate signal which may render the FOG unsuitable for use in high accuracy applications.

DISCLOSURE OF INVENTION

An object of the present invention is the provision of a fiber optic rotation sensor having a phase modulator whose frequency is controlled to that of the coil eigenfrequency so as to reduce errors in rotation rate measurement.

According to the present invention, a fiber optic rotation sensor having a pair of light waves counter-propagating in a loop includes a modulator driven by a signal at the loop eigenfrequency, upon exiting the loop the waves are combined into a light intensity signal which is sensed, the sensed signal including a component typically in a quadrature (ninety degree) phase relationship with the rotation rate component, the magnitude of the quadrature component being proportional to any deviations in the modulator driving frequency from the loop eigenfrequency, the magnitude of the quadrature component used in feedback fashion to control the frequency of the modulator driving signal at the eigenfrequency by driving the quadrature component to zero magnitude, thereby compensating for any deviations in the modulator driving signal frequency from the loop eigenfrequency.

The present invention has utility in providing for servo control of the modulation frequency at the loop eigenfrequency. This allows the FOG to provide a more accurate indication of rotation rate over wide variations in environment. Such operation also reduces potential errors associated with spurious optical intensity modulations in the phase modulator and with optical backscatter in the fiber coil.

The foregoing and other objects and advantages of the present invention will become more apparent in the light of the following detailed description of an exemplary embodiment thereof, as illustrated in the accompanying drawing.

BEST MODE FOR CARRYING OUT THE INVENTION

Figure 1:
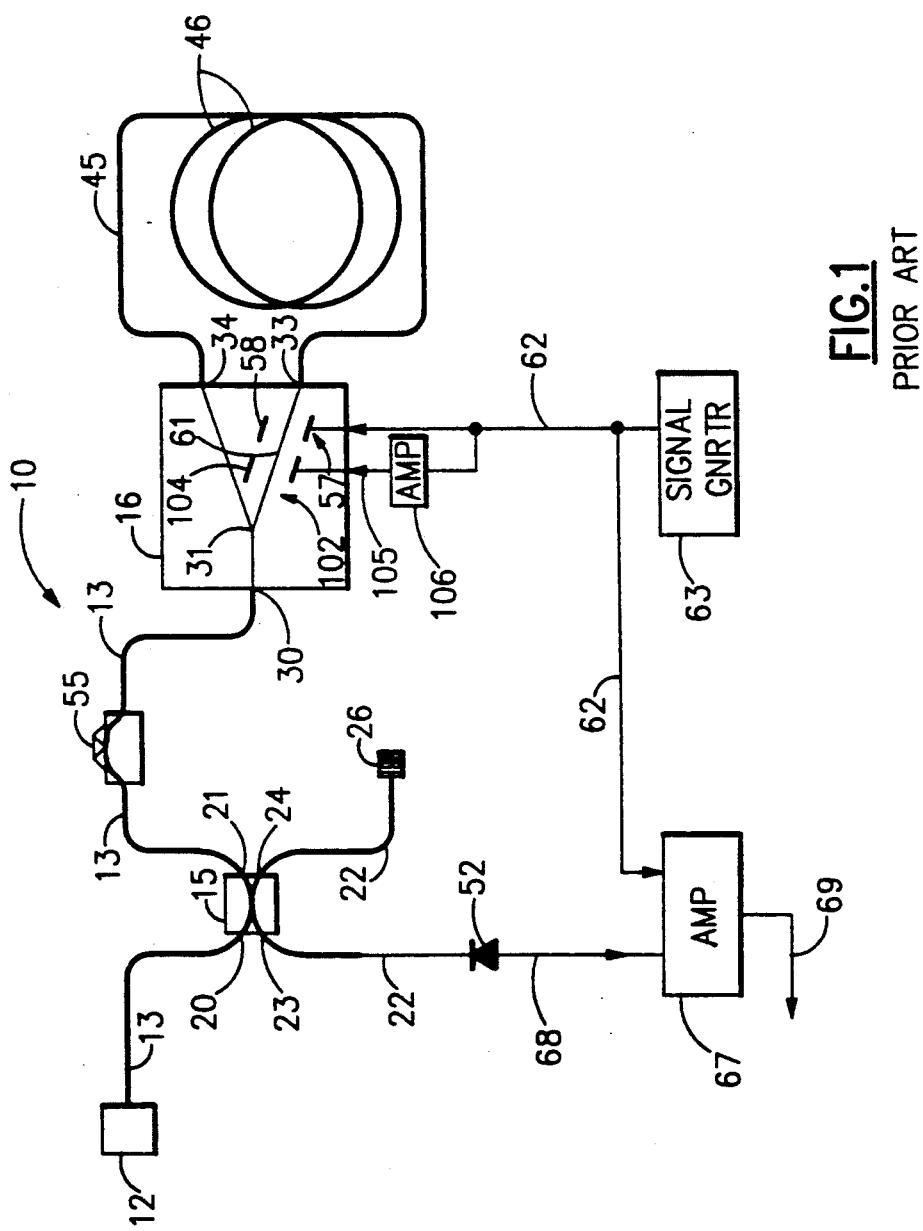
FIG. 1 is a schematic drawing of a fiber optic rotation sensor without the apparatus of the present invention therein.

FIG. 1 illustrates a fiber optic rotation sensor, typically a fiber optic gyroscope (FOG) 10, having a light source 12, e.g., a laser diode or super luminescent diode, coupled to a length of a first optical fiber 13. The fiber 13 is preferably a single-mode, high birefringence optical fiber, although non-birefringent fiber may be used. Light from the source 12 is optically coupled to an end of the first fiber 13 to maximize the amount of light entering therein.

The first fiber 13 passes through a beamsplitter (directional optical coupler) 15 to direct light to an integrated optical (IO) device 16. The coupler 15 may be fabricated using either the known fusion elongation method or the known mechanical polishing method.

The first fiber 13 enters the coupler 15 at a first port 20 and exits through a second port 21, and couples light to a second optical fiber 22 which enters the coupler at a third port 23 and exits through a fourth port 24. The second fiber 22 may be coupled at the fourth port 24 to a non-reflective termination 26, e.g., a light-absorbing terminator or a power monitoring system. Light entering the first port 20 is split into two waves which may be of approximately equal intensity. One wave propagates into the second fiber 22 and exits at the fourth port 24. The other wave propagates in the first fiber and exits through the second port 21

Light exiting the second port 21 is optically coupled to a first port 30 of the IO device 16, in accordance with, e.g., commonly owned U.S. Pat. No. 4,871,226 to Courtney et al., the disclosure of which is hereby incorporated by reference. The IO device 16 comprises a Y-shaped optical waveguide 31. The light is split into two substantially equal waves which exit the device 16 at second and third ports 33,34.

A third optical fiber 45 is wound into a Sagnac sensing loop 46. The fiber 45 typically comprises a single-mode fiber, but may be a multi-mode fiber if desired. The fiber 45 is optically coupled to the second and third ports 33,34 of the IO device in a similar manner as described hereinbefore with reference to the first port 30. The two waves exiting the IO device via the second and third ports 33,34 counter-propagate in the loop 46. The loop 46 may comprise a plurality of turns of optical fiber wound, e.g., on a cylindrical spool.

After traversing the loop 46, the waves re-enter the IO device 16 via the second and third ports 33,34 and are recombined by the waveguide 31. The recombined waves exit the IO device 16 via the first port 30, and propagate in the first fiber 13 to the coupler second port 21. The light is then split into two waves which may be of approximately equal intensity. One wave propagates in the first fiber 13, exits through the first port 20, and passes through, or is absorbed by the source 12. The other wave propagates in the second fiber 22 and exits through the third port 23 to a photodetector 52, e.g., a photodiode. The photodetector provides an electrical signal proportional to the intensity of the optical signal at the third port 23, this optical signal representing the optical output signal of the FOG.

Preferably, a polarizer 55 may be formed on the first fiber 13 between the coupler 15 and the IO device 16. The polarizer 55 acts as a single-polarization filter, allowing light of one polarization mode to propagate therethrough while preventing light of an orthogonal polarization mode from propagating therethrough.

The IO device 16 also includes a phase modulator 57 comprising a pair of electrodes 58 fabricated using known techniques on a leg 61 of the waveguide 31 adjacent to the second port 33. The modulator 57 is driven by a signal on a line 62 at a modulation frequency by a known AC signal generator 63.

The generator output on the line 62 is also fed as a reference signal to a known lock-in amplifier 67. The amplifier 67 also receives the electrical signal from the photodetector 52 on a line 68. The reference signal enables the amplifier 67 to synchronously detect the photodetector signal on the line 68 at the modulation frequency. More specifically, the amplifier detects the first harmonic component of the intensity variations of the optical output signal on the line 22 while blocking all other harmonics of the modulation frequency. In particular, the amplifier detects the in-phase portion of the first harmonic component, i.e., the portion which is in phase with the reference signal on the line 62. The magnitude of this in-phase first harmonic component of the optical output signal is proportional, through a certain operating range, to the rotation rate of the FOG 10. The amplifier 67 outputs a signal on a line 69 which is proportional to the first harmonic component, and thus provides a direct indication of the rotation rate.

If the FOG is operated with zero modulation frequency, i.e., the signal generator 63 inoperative, the intensity, $I_o$, of the optical output signal on the line 22 is a cosine function of the Sagnac phase difference, $\Phi_R$, between the counter-propagating waves as given by:

$$I_o = I_1 + I_2 + 2(I_1 I_2)^{\frac{1}{2}} \cos(\Phi_R) \qquad \text{(eq. 1)}$$

where: $I_1$ and $I_2$ are the individual intensities of the counter-propagating waves.

Figure 2:
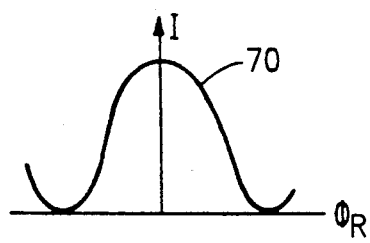
FIG. 2 is a graph of the intensity of an optical output signal in the sensor of FIG. 1 as a function of a rotationally induced phase difference.

FIG. 2 illustrates a curve 70 of the relationship of equation 1. As can be seen, $I_o$ is a maximum when the phase difference is zero. Also, rotation-induced phase differences between the waves cause $I_o$ to vary symmetrically about the vertical axis. The intensity of the optical output signal is relatively insensitive to small changes in phase difference.

Figure 3:
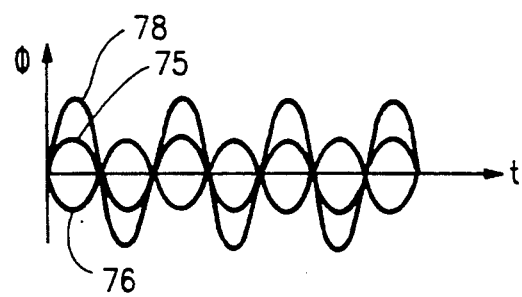
FIG. 3 is a graph of phase difference versus time between a pair of counter-propagating waves in the sensor of FIG. 1.

In FIG. 3, the counter-propagating waves modulated 180° out of phase from each other are illustrated by sinusoidal curves 75,76. Use of a modulation frequency which provides such 180° phase difference is desirable since it eliminates modulator-induced amplitude modulation in the optical output signal and it maximizes the phase difference between the counter-propagating waves.

In order to produce the 180° phase relationship between the counter-propagating waves, the modulation frequency is set at some odd integer multiple of the loop eigenfrequency, $f_e$, which is given by:

$$f_e = \tfrac{1}{2}\tau = c/2nL \qquad \text{(eq. 2)}$$

where: $\tau$ is the loop transit time, c is the speed of light in a vacuum; n is the index of refraction of the loop optical fiber; and L is the length of the loop optical fiber.

With a modulation frequency of $f_e$, the phase difference, $\Phi_1$, between the modulated waves 75,76 is illustrated in FIG. 3 by a sinusoidal curve 78. The curve 78 is obtained by subtracting the curves representing the counter-propagating waves, i.e., curve 75–curve 76.

Modulation-induced phase differences, $\Phi_1$, in the waves are indistinguishable from rotationally-induced Sagnac phase differences, $\Phi_R$. The intensity of the optical output signal on the line 22 is therefore a function of the total phase difference, $\Phi_T$, between the waves as given by:

$$I_o = I_1 + I_2 + 2(I_1 I_2)^{\frac{1}{2}} \cos(\Phi_T) \qquad \text{(eq. 3)}$$

where:
$$\Phi_T = \Phi_R + \Phi_1 \qquad \text{(eq. 4)}$$

Figure 4:
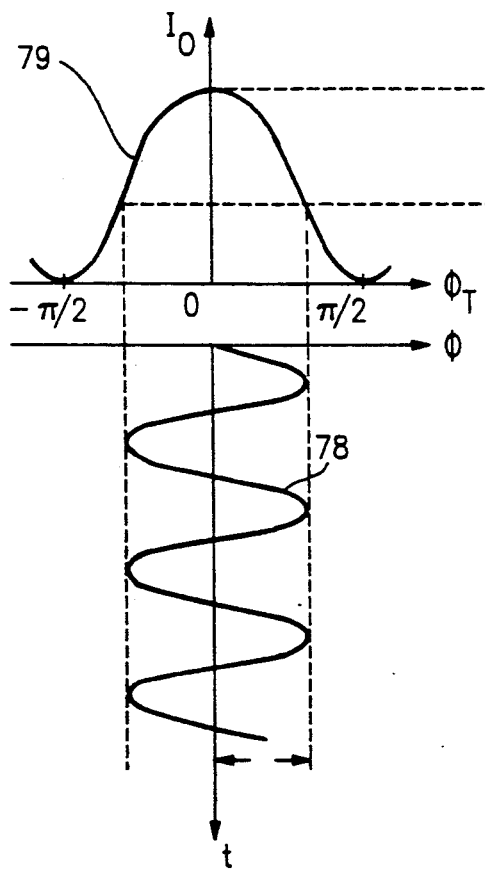
FIG. 4 is a graph illustrating the effect of phase modulation upon the intensity of an optical output signal in the sensor of FIG. 1, with the sensor at rest.
Figure 4:
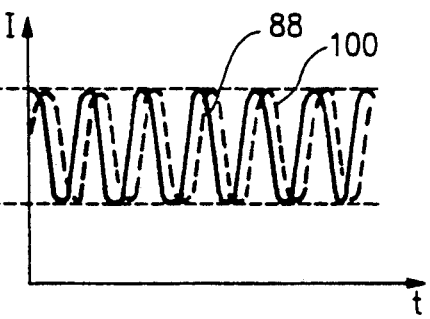

Illustrated in FIG. 4 is the effect of the modulator-induced phase difference, $\Phi_1$, on the optical output signal intensit $I_o$. A cosine curve 79 illustrates the relationship of equation 3. When the relative phase angle between the waves is zero, the intensity of the combined waves is a maximum. When the relative phase between the waves is nonzero, the optical output signal has a lower intensity depending upon the magnitude of the phase difference $\Phi_T$. The intensity continues to decrease with increasing $\Phi_T$ until the relative phase difference is either plus or minus 180°, at which point the two counter-propagating waves destructively interfere and the intensity is zero.

In the absence of FOG rotation, the only component of total phase difference, $\Phi_T$, in equation 3 is the modulator-induced phase difference $\Phi_1$, as illustrated by curve 78. The modulation-induced phase difference curve 78 causes the optical output signal intensity at the detector to vary as illustrated in curve 88. The curve 88 is obtained by translating the points on the curve 78 onto the curve 79. Curve 78 represents the instantaneous phase difference between the counter-propagating waves, while curve 88 represents the resulting intensity of the optical output signal for that particular instantaneous phase difference. The translation of the curve 78 through the curve 79 is symmetrical about the vertical axis of the curve 79, so that the optical intensity measured by the detector 52 varies periodically at a frequency equal to the second harmonic of the modulating frequency, as illustrated by the curve 88.

As described hereinbefore, the amplifier 67 is synchronized to detect only the in-phase portion of the first harmonic of the optical output signal on the line 22. But since the detector output signal is at the second harmonic of the modulation frequency, (curve 88), the output signal on the line 69 from the amplifier 67 will be zero, indicating zero rotation.

Figure 5:
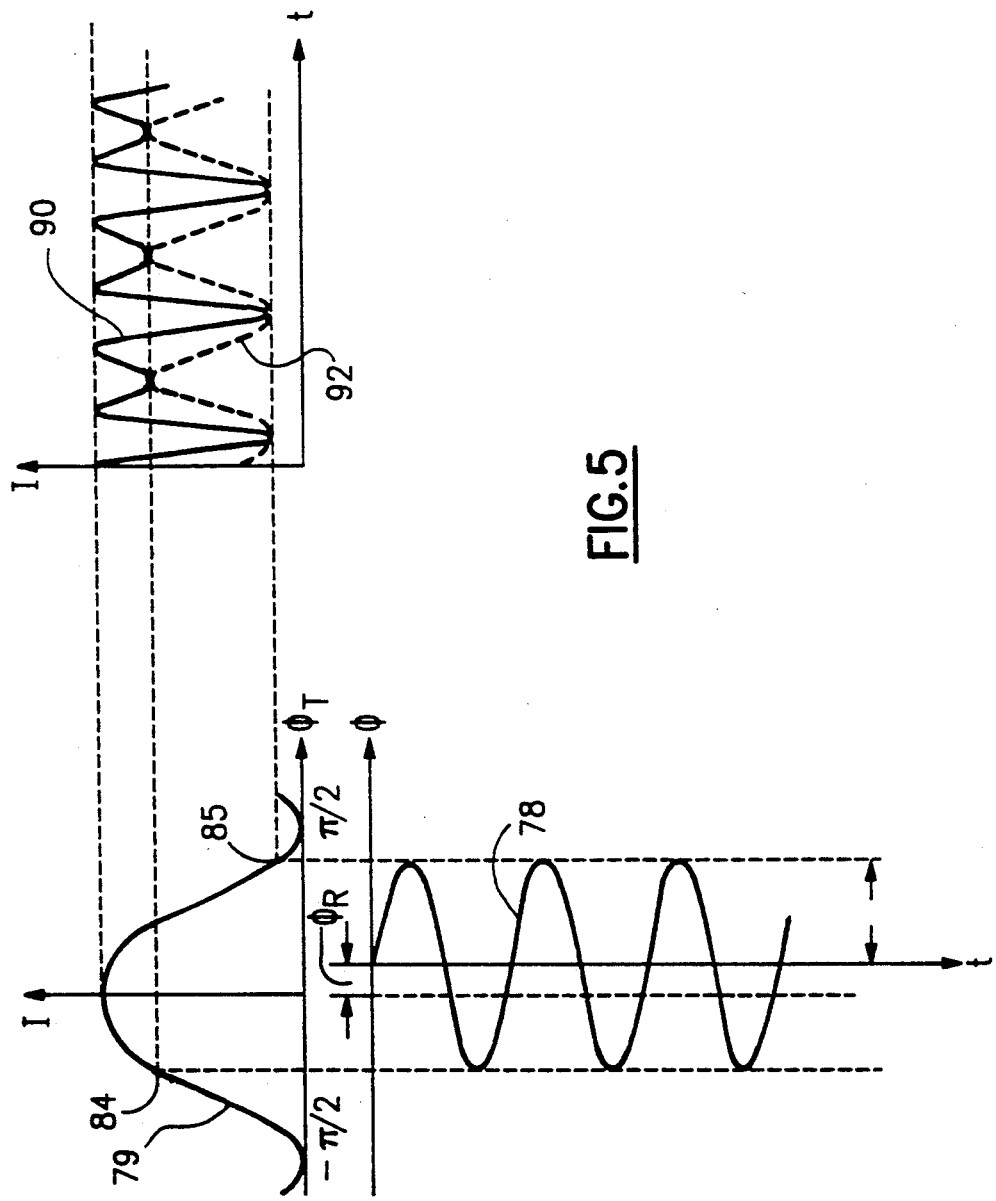
FIG. 5 is a graph illustrating the effect of phase modulation upon the intensity of the optical output signal in the sensor of FIG. 1 with sensor rotation.

When the loop 46 is rotated, the phase of the counter-propagating waves is shifted per the Sagnac effect. The Sagnac phase shift both provides a constant phase difference $\Phi_R$ for a constant loop rotation velocity and adds to the modulation-induced phase shift $\Phi_1$ so that the entire curve 78 is translated in phase from the zero rotation position shown in FIG. 4, by an amount equal to $\Phi_R$, as illustrated in FIG. 5. This causes the optical output signal to vary non-symmetrically along the curve 79 between the points 84 and 85, which in turn produces an optical output signal as illustrated by curve 90.

The optical output signal 90 has a first harmonic component as illustrated in phantom by sinusoidal curve 92. Curve 92 is in phase with the reference signal on the line 62 as well as the phase modulation curve 78, and its RMS value is proportional to the sine of the rotationally induced Sagnac phase difference $\Phi_R$. Since the amplifier 67 synchronously detects in-phase signals having the fundamental frequency of the modulator 57, the amplifier output on the line 69 is proportional to the RMS value of the curve 92. As described hereinbefore, this signal can be used to indicate the FOG rotation rate.

FIG. 5 illustrates the optical output signal 90 for one direction of rotation of the loop. However, if the loop is rotated in the opposite direction at an equal velocity, the optical output signal is similar to that illustrated in FIG. 5, except for a translation such that the curve 90 is shifted 180° from its position in FIG. 5. The amplifier 67 detects this 180° phase difference for the optical output signal by comparing the phase of the first harmonic curve 92 with the phase of the reference signal from generator 63 to determine whether the rotation of the loop is clockwise or counter-clockwise. Depending on the direction of rotation, the amplifier may provide as output either a positive or negative signal. Regardless of the direction of rotation, the magnitude of the signal is the same for equal rates of rotation of the loop.

The rotation rate sensing system described hereinbefore with reference to FIGS. 1-5 is effective within a certain range of rotational velocities for the loop 46 for which the output of the amplifier 67 varies approximately linearly with rotation rate. The effective range of the FOG can be extended, if desired, by using known feedback techniques, e.g., comprising serrodyne phase modulation, to null the Sagnac phase shifts.

Whether or not a range extending technique is used, the accuracy of rotation measurement may be reduced when the modulation frequency is not equal to the loop eigenfrequency or an odd integer multiple thereof. This is because certain errors, such as some caused by optical backscatter, cancel only if the modulation frequency equals the eigenfrequency, and because FOG system imperfections may permit the in-phase amplifier 67 to respond spuriously to quadrature (90 degrees out of phase) signals associated with deviations from the eigenfrequency, as described hereinafter.

Typically, the modulator 57 may cause spurious intensity modulation, as well as the intended phase modulation, of the waves passing therethrough. If the modulation frequency is equal to the loop eigenfrequency, the resultant intensity modulations seen in the counter-propagating waves exiting the loop 46 are out of phase and cancel each other.

However, if the modulation frequency differs slightly from the eigenfrequency, the cancellation is incomplete, and photodetector 52 sees an intensity modulation component which is proportional to the deviation from the eigenfrequency and which is substantially in quadrature with the phase reference signal on the line 62, and with the rotation induced curve 92, as illustrated by curve 100 in FIG. 4. The resulting quadrature signal on the line 68 may contribute spuriously to the output of the in-phase amplifier 67 if, e.g., the amplifier phase circuits drift or are misadjusted.

In some cases, it may actually be desirable to modify the modulator 57 to increase the magnitude of the spurious intensity modulation, and thus the quadrature signal. This is because the present invention relies on the presence of this signal to sense and null any deviations from the eigenfrequency, in order, e.g., to reduce the aforementioned backscatter errors. When the frequency deviations are nulled, the quadrature component, whether spuriously or intentionally introduced, is automatically nulled, thereby preventing it from adversely affecting the output of the amplifier 67.

The modulator 57 may typically be modified by shortening the length of the electrodes 58 on the IO device. The magnitude of the voltage signal on the line 62 from the generator 63 is then increased so as to increase the magnitude of the spurious intensity modulation, and thus the quadrature signal. The increased voltage has marginal effect on the resulting phase modulation of the waves caused by the modulator.

In the alternative, FIG. 1 illustrates a separate intensity modulator 102 comprising a pair of electrodes 104 fabricated on the IO device on the leg 61 of the waveguide 31. The modulator 102 is driven by a signal on a line 105 from an amplifier 106 which provides the proper voltage amplification of the generator signal on the line 62. In a similar manner, the effect of the intensity modulator is to increase the magnitude of the spurious intensity modulation, and thus the quadrature signal.

Figure 6:
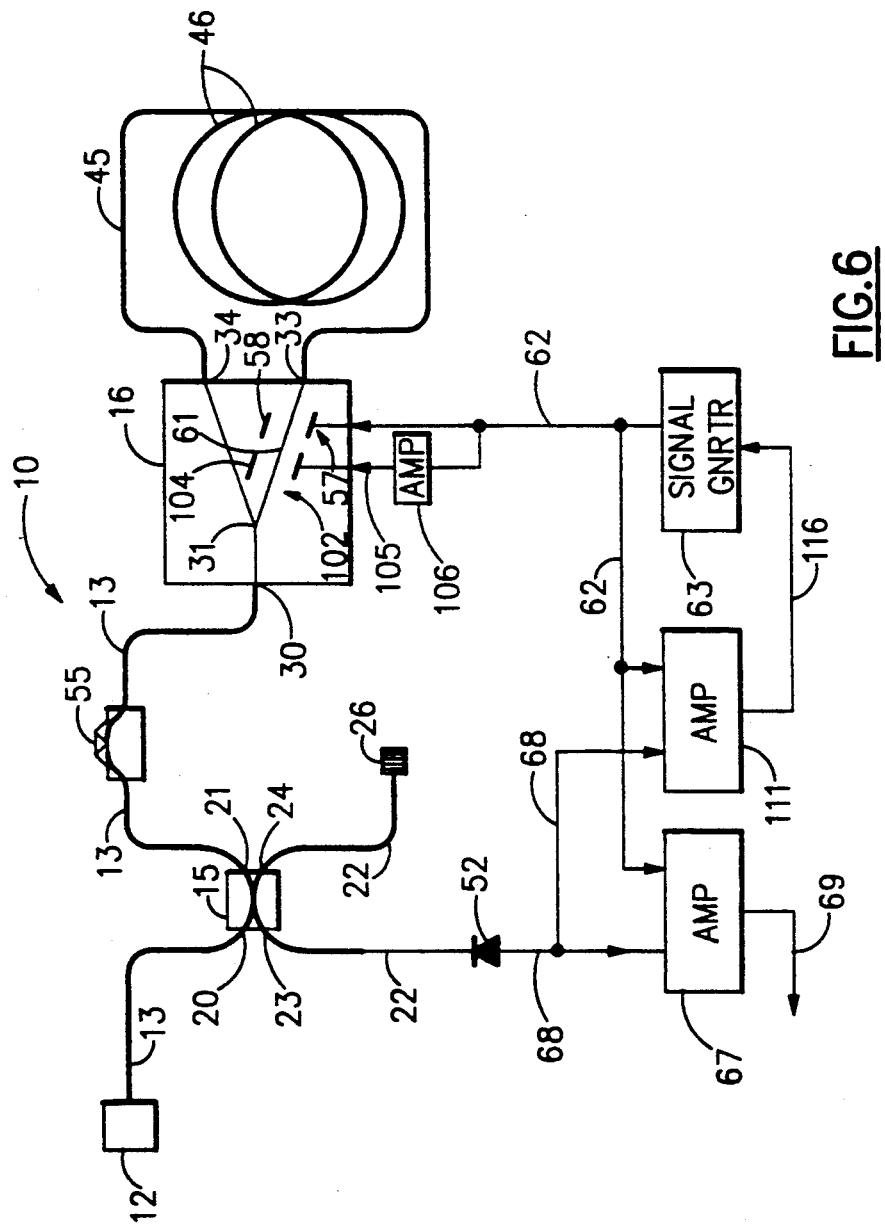
FIG. 6 is a schematic drawing of the sensor of FIG. 1 with the apparatus of the present invention implemented therein.

In FIG. 6, the FOG 10 of FIG. 1 is illustrated with the modulation frequency control apparatus of the present invention implemented therein. The curves in FIGS. 2-5 remain valid in illustrating the operation of the FOG of FIG. 6. The electrical signal on the line 68 from the detector 52 is fed to a second (quadrature) amplifier 111, which may be similar to the first lock-in amplifier. In a manner similar to FIG. 1, the generator provides the synchronizing reference signal on the line 62 to the quadrature amplifier 111 to enable the quadrature amplifier to synchronously detect a quadrature component of the detector signal on the line 68 at the reference signal frequency, e.g., the loop eigenfrequency. The reference signal also enables the first lock-in amplifier 67 to detect the in-phase component (i.e., desired rotational rate information) of the detector signal at the same frequency.

The quadrature amplifier provides a signal on a line 116 to the generator 63, the signal being indicative of the magnitude and sign of the quadrature output signal. The generator is responsive thereto in adjusting the frequency of the modulating signal on the line 62 to the phase modulator to equal that of the eigenfrequency In this way, the generator is being used as a well-known voltage controlled oscillator (VCO). The resulting modulation of the counter-propagating waves makes the intensity of the quadrature output signal (curve 100) equal to zero, indicating that the frequency of the modulation signal on the line 62 equals the current value of the loop eigenfrequency, thereby compensating for dynamic variations in the loop eigenfrequency due to environmental changes.

A FOG having the apparatus of the present invention implemented therein provides a more accurate indication of rotation rate over wide variations in environment over known prior art FOGs. Such operation also reduces potential errors associated with spurious optical intensity modulations in the phase modulator and with optical backscatter in the fiber coil.

As described, the apparatus of the present invention is implemented in a fiber optic gyroscope However, it is to be understood that the present invention may be implemented, if desired, in other types of interferometers in a manner which should be apparent to one of ordinary skill in the art in light of the teachings herein.

As illustrated, the IO device 16 is described as having the Y-shaped waveguide 31 and phase modulator 57 fabricated thereon However, the coupler 15 and polarizer 55 may also be fabricated thereon if desired. Such fabrication eliminates a portion of the optical fibers 13,22. Also, the source 12 and detector 52 may be disposed to abut the IO device 16 directly, thereby eliminating the first and second fibers 13,22 altogether. Further, the coupler 15 is illustrated as having the fiber 13,22 passing therethrough. However, the coupler 15 may instead be such that end surfaces of the fibers interface at the ports 20,21,22,23 thereof.

All of the foregoing changes are irrelevant; it suffices for the present invention that a fiber optic rotation sensor having a pair of light waves counter-propagating in a loop includes a modulator driven by a signal at the loop eigenfrequency, upon exiting the loop the waves are combined into a light intensity signal which is sensed, the sensed signal including an component typically in a quadrature (ninety degree) phase relationship with the rotation rate component, the magnitude of the quadrature component being proportional to any deviations in the modulator driving frequency from the loop eigenfrequency, the magnitude of the quadrature component being used in feedback fashion to control the frequency of the modulator driving signal at the eigenfrequency by driving the quadrature component to zero magnitude, thereby compensating for any deviations in the modulator driving signal frequency from the loop eigenfrequency.

Although the invention has been described and illustrated with respect to certain exemplary embodiments thereof, it should be understood by those skilled in the art that various changes, omissions and additions may be made without departing from the spirit and the scope of the invention.

I claim:

1. Apparatus for controlling the frequency of a modulation signal applied to a pair of counter-propagating light waves in an optical waveguide loop, comprising:
    signal generator means, for generating the modulation signal having a certain frequency;
    phase modulator means, for phase modulating said light waves in response to said modulation signal;
    means for combining said light waves to form an optical output signal; and
    detection means, for detecting said optical output signal, and for providing a feedback signal proportional to the magnitude of a component of said optical output signal, said magnitude of said component being proportional to any deviation in the frequency of the modulation signal from said certain frequency, said signal generator means being responsive to said feedback signal in generating the modulation signal at a frequency equal to said certain frequency, said magnitude of said component being driven to zero when the frequency of the modulation signal equals said certain frequency.

2. Apparatus according to claim 1, wherein said phase modulator means further comprises means, responsive to said modulation signal, for intensity modulating said light waves in synchronization with said modulation signal so as to increase said magnitude of said component.

3. Apparatus according to claim 1, further comprising:
    voltage amplification means, for amplifying said modulation signal and for providing an amplified modulation signal indicative thereof; and
    intensity modulation means, responsive to said amplified modulation signal, for intensity modulating said light waves in synchronization with said modulation signal so as to increase said magnitude of said component.

4. Apparatus according to claim 1, wherein said component of said optical output signal is in quadrature phase relationship with a normal in-phase component of said optical output signal, said in-phase component being indicative of any non-reciprocity in the optical waveguide loop which causes inequality in the optical path lengths of the counter-propagating waves.

5. Apparatus according to claim 1, wherein the value of said certain frequency is an odd integer multiple of the eigenfrequency of the optical waveguide loop.

6. Apparatus according to claim 1, wherein said means for combining comprises optical coupling means for recombining said light waves after counter-propagating through the optical waveguide loop.

7. Apparatus according to claim 1, wherein said signal generator means comprises a voltage controlled oscillator.

8. Apparatus according to claim 1, wherein said detection means further comprises amplifier means, said detection means detecting said optical output signal and providing an electrical signal indicative thereof, said amplifier means responsive to said electrical signal in amplifying said electrical signal and for providing said feedback signal.

9. Apparatus according to claim 8, wherein said signal generator means comprises means for providing the modulation signal to said amplifier means, said amplifier means synchronously responsive to the frequency and phase of the modulation signal in amplifying said electrical signal at the frequency of the modulation signal.

10. Apparatus according to claim 1, wherein said detection means further comprises a photoelectric detector for detecting said optical output signal and for providing said electrical signal indicative thereof.

11. Apparatus according to claim 10, wherein said photoelectric detector is a photodiode.

12. A fiber optic rotation sensor, comprising:
an optical waveguide loop;
means for providing a pair of light waves counterpropagating in said loop;
signal generator means, for generating a modulation signal having a certain frequency;
phase modulator means, for phase modulating said light waves in response to said modulation signal;
means for combining said light waves after counterpropagating in said loop, and for providing an optical output signal indicative thereof, said combined light waves having a phase difference therebetween proportional to any rotation of said loop;
detection means, for detecting said optical output signal, and for providing a feedback signal proportional to the magnitude of a component of said optical output signal, said magnitude of said component being proportional to any deviation in the frequency of said modulation signal from said certain frequency, said signal generator means being responsive to said feedback signal in generating the modulation signal at a frequency equal to said certain frequency, said magnitude of said component being driven to zero when the frequency of said modulation signal equals said certain frequency.

13. Apparatus according to claim 12, wherein said phase modulator means further comprises means, responsive to said modulation signal, for intensity modulating said light waves in synchronization with said modulation signal so as to increase said magnitude of said component.

14. Apparatus according to claim 12, further comprising:

voltage amplification means, for amplifying said modulation signal and for providing an amplified modulation signal indicative thereof; and
intensity modulation means, responsive to said amplified modulation signal, for intensity modulating said light waves in synchronization with said modulation signal so as to increase said magnitude of said component.

15. Apparatus according to claim 12, wherein said component of said optical output signal is in quadrature phase relationship with a normal in-phase component of said optical output signal, said in-phase component being indicative of the rotation-related phase difference between said waves.

16. Apparatus according to claim 12, wherein the value of said certain frequency is an odd integer multiple of the eigenfrequency of said optical waveguide loop.

17. Apparatus according to claim 12, wherein said means for combining comprises optical coupling means for recombining said light waves after counter-propagating through said loop.

18. Apparatus according to claim 12, wherein said signal generator means comprises a voltage controlled oscillator.

19. Apparatus according to claim 12, wherein said optical waveguide loop comprises single-mode optical fiber.

20. Apparatus according to claim 12, wherein said detection means further comprises amplifier means, said detection means detecting said optical output signal and providing an electrical signal indicative thereof, said amplifier means responsive to said electrical signal in amplifying said electrical signal and for providing said feedback signal.

21. Apparatus according to claim 20, wherein said signal generator means comprises means for providing said modulation signal to said amplifier means, said amplifier means synchronously responsive to the frequency and phase of said modulation signal in amplifying said electrical signal at the frequency of said modulation signal.

22. Apparatus according to claim 12, wherein said detection means further comprises a photoelectric detector for detecting said optical output signal and for providing said electrical signal indicative thereof.

23. Apparatus according to claim 22, wherein said photoelectric detector is a photodiode.

* * * * *